United States Patent [19]

Seksaria et al.

[11] Patent Number: 5,342,243

[45] Date of Patent: Aug. 30, 1994

[54] UNIVERSAL JOINT YOKE

[75] Inventors: Dinesh Seksaria, Murrysville; Charles I. Fuller, Monroeville, both of Pa.

[73] Assignee: Aluminum Company of America, Pittsburgh, Pa.

[21] Appl. No.: 858,047

[22] Filed: Mar. 26, 1992

[51] Int. Cl.⁵ ............................ F16D 3/26; F16D 3/40
[52] U.S. Cl. ............................................ 464/134
[58] Field of Search ........................ 464/134–136, 464/162; 403/57, 58

[56] References Cited

U.S. PATENT DOCUMENTS

| | | | |
|---|---|---|---|
| 658,057 | 9/1900 | Bocorselski . | |
| 699,904 | 5/1902 | Warren . | |
| 719,411 | 1/1903 | Bocorselski . | |
| 2,575,602 | 11/1951 | Stillwagon, Jr. | 464/134 |
| 3,107,506 | 10/1963 | Klomp | 464/134 X |
| 3,367,142 | 2/1968 | Groves et al. | 464/162 |
| 3,501,928 | 3/1970 | Pitner | 464/134 |
| 3,677,032 | 7/1972 | Suzuki . | |
| 3,867,050 | 2/1975 | Pitner | 403/373 |
| 3,871,192 | 3/1975 | Muhr et al. | 464/134 |
| 4,192,153 | 3/1980 | Fisher . | |
| 4,272,972 | 6/1981 | James | 464/134 X |
| 4,334,414 | 6/1982 | Stephan | 464/134 |
| 4,881,924 | 11/1989 | Gall | 464/134 |
| 5,076,344 | 12/1991 | Fields et al. | 164/457 |

Primary Examiner—Daniel P. Stodola
Assistant Examiner—Eileen A. Dunn
Attorney, Agent, or Firm—David V. Radack; Thomas R. Trempus; Tracey D. Beiriger

[57] ABSTRACT

A universal joint yoke having a tubular body and a pair of ears projecting generally axially therefrom is provided. The ears-have an inner surface, an outer surface and an ear connecting surface. The ear connecting surface has a pair of lower portions, a pair of transition portions and an upper portion. The lower portions are oriented such that a generally straight line drawn in the tubular body connecting surface plane goes through (i) a point at the junction of the ear outer surface and the ear connecting surface; (ii) a point at the junction of the ear inner surface and the ear connecting surface; and (iii) a point on the axis of the tubular body. The upper portion is oriented such that a generally straight line drawn between (i) a point on the junction of the ear outer surface and the ear connecting surface and (ii) a point at the junction of the ear inner surface and the ear connecting surface is generally parallel to the common axis. The universal joint yoke includes a generally concave endcap.

17 Claims, 3 Drawing Sheets

UNIVERSAL JOINT YOKE

BACKGROUND OF THE INVENTION

1. Field Of The Invention:

This invention relates to a universal joint yoke and an associated method and more specifically to a universal joint yoke which is formed by a vacuum die casting process and which is configured to function efficiently as a torque transmitting device.

2. Background Information:

A universal joint is a well known mechanical device which is capable of transmitting rotation from a first shaft to second shaft that is not collinear with the first shaft. One application for the universal joint is in vehicles such as automobiles. Examples of prior art universal joints are disclosed in U.S. Pat. Nos. 699,904 and 719,411.

A universal joint yoke is a piece that connects to each of the drive shafts. Each yoke consists of a tubular body which has an end for receiving the shaft and another end from which a pair of ears project axially. The ears each define a hole for mounting of a bearing. The two bearings are attached to form the universal joint "cross".

Universal joint yokes have traditionally been made from an assembly of components welded together or machined from forged metal blanks. The disadvantages of the welded yoke are that there is a weakness in the yoke at the welded joint and the high component and labor costs. The disadvantage of the forged yoke is that the material is very expensive and much of it is machined away as scrap. Furthermore, the forgoing process limits the shape of the resulting yoke, thus producing inefficient use of the forged metal.

It has been known to make universal joint yokes from castings, however, these cast yokes had unacceptably high porosity which adversely affected the performance of universal joint yoke. Additionally, because of the high porosity, drive shaft tubes could not be welded to the cast yokes.

The shape of the universal joint yoke is especially important for efficient use of the material of which the yoke is composed. The shape of the yoke also affects the stiffness thereof as well as the distribution of stresses thereon. The strongest forces on the yoke are concentrated at the base portion of the ears where the ear is adjacent to the upper surface of the tubular body. Prior art yokes had flat ears which extended axially from the body, and thus were vulnerable at the junction of the ears and the body to metal fatigue. See, for example, U.S. Pat. No. 4,192,153.

U.S. Pat. No. 4,334,414 discloses a universal joint yoke having ears with a cylindrical outer surface and a cylindrical inner surface. The shape of the ears are inturned towards the rotational axis so that the depth of the bore can be increased. This patent, however, is not concerned with the stiffness of the ears or with the distribution of stresses thereon.

Therefore, despite the prior art universal joint yokes, there remains a need for a universal joint yoke that is shaped to result in more uniform distribution of stresses, has greater stiffness and that is lighter in weight than prior art yokes. There is also a need for a method of making a universal joint yoke which is efficient and cost effective while producing a high quality universal joint yoke.

SUMMARY OF THE INVENTION

The universal joint yoke of the invention has met the hereinbefore described needs. The universal joint yoke of the invention comprises a generally cylindrical tubular body having an outer surface, an inner surface and a connecting surface disposed between the outer and inner surface. The tubular body connecting surface is generally oriented in a plane which is generally perpendicular to the axis of the tubular body. A pair of ears, each having an outer surface, an inner surface and a connecting surface disposed between the outer and inner surfaces, project generally axially from one end of the tubular body. The ears each have a base disposed adjacent the tubular body and distal end disposed away from the base. Each of the ears define a hole, with the holes of the ears being substantially aligned along a common axis.

The ear connecting surfaces have a pair of lower portions adjacent the base, an upper portion adjacent the distal end and a pair of transition portions connecting the lower portions to the upper portion. The lower portions are oriented such that a generally straight line drawn in the tubular body connecting surface plane goes through (i) a point at the junction of the ear outer surface and the ear connecting surface; (ii) a point at the junction of the ear inner surface and the ear connecting surface; and (iii) a point on the axis of the tubular body. The upper portion is oriented such that a generally straight line drawn between (i) a point on the junction of the ear outer surface and the ear connecting surface and (ii) a point at the junction of the ear inner surface and the ear connecting surface is generally parallel to the common axis.

Another embodiment of the universal joint yoke comprises a generally cylindrical tubular body and a pair of ears projecting generally axially from one end of the tubular body. The tubular body includes an endcap which is generally upwardly concave.

A method of forming a universal joint yoke by utilizing a vacuum die casting process is also provided. Another method of the invention comprises vacuum die casting a universal joint yoke, providing a drive shaft and welding the drive shaft to the vacuum die cast universal joint yoke to form a drive assembly.

It is an object of the invention to provide a universal joint yoke made by a vacuum die casting process.

It is a further object of the invention to provide a yoke having cylindrically curved ears.

It is a further object of the invention to provide a yoke which is more effective in distributing stresses and reducing the concentration of stresses at the base portion of the ears than prior art yokes.

It is a further object of the invention to provide a lightweight, high performance universal joint yoke.

It is a further object of the invention to use a spherical shape for the end closure that permits uniform distribution of the yoke's stiffness and avoids concentration of stresses.

These and other objects of the invention will be more fully understood from the following description of the invention with reference to the drawings appended to this Application.

DESCRIPTION OF THE PREFERRED EMBODIMENTS

Figure 1:
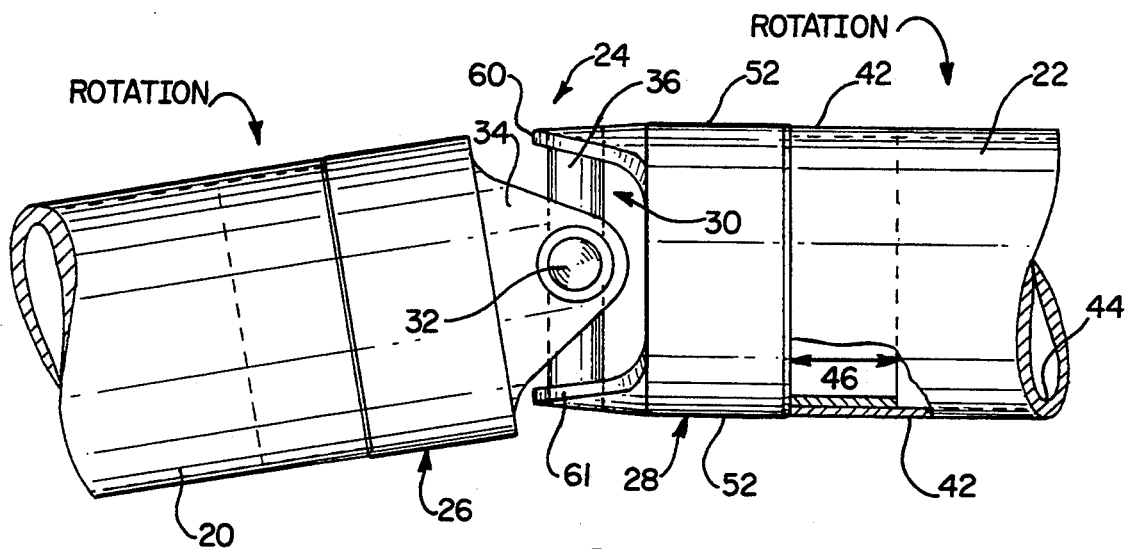
FIG. 1 is a perspective view, partially in section, of a universal joint showing a pair of non-collinear drive shafts attached to a pair of universal joint yokes.

As was explained above, a universal joint enables the transmission of rotation from a first shaft to a second shaft that is not collinear with the first shaft. Referring to FIG. 1, a first shaft 20 is shown that is not collinear with a second shaft 22. The shafts 20 and 22 can be drive shafts in a vehicle, for example. The rotation of first shaft 20 is transmitted to the second shaft 22 by means of a universal joint 24, which includes a pair of universal joint yokes 26 and 28. Universal joint yoke 26 is attached to first shaft 20 and universal joint yoke 28 is attached to second shaft 22.

The universal joint bearing "cross" 30 is disposed between the universal joint yokes 26 and 28. The cross 30 consists of a first bearing 32 mounted in diametrically opposed ears only one of which, ear 34, that can be seen in FIG. 1, of universal joint yoke 26 and a second bearing 36 mounted in the ears 60 and 61 of the second universal joint yoke 28. As is known, the universal joint cross 30 transmits the rotation of the first shaft 20 to the second shaft 22.

The shafts 20 and 22 are preferably hollow cylindrical members having an outer surface and an inner surface such as outer surface 42 and inner surface 44 of shaft 22. The outer surface 42 is generally aligned with the outer surface 52 of the universal joint yoke 28. The shaft 22 is preferably welded onto a radially reduced portion 46 of the universal joint yoke 28. This will eliminate a step at the junction of the universal joint yoke 28 and the shaft 22. This will reduce stress concentrations at the junction which will result in greater joint durability. It is to be understood, however, that still other means of connecting yoke 28 to shaft 22 may be employed in this invention. For example, it may not be necessary to have a radially reduced portion 46 nor may it be necessary to have the radial extent of the yoke be the same as the radial extent of the shaft 22.

Figure 2:
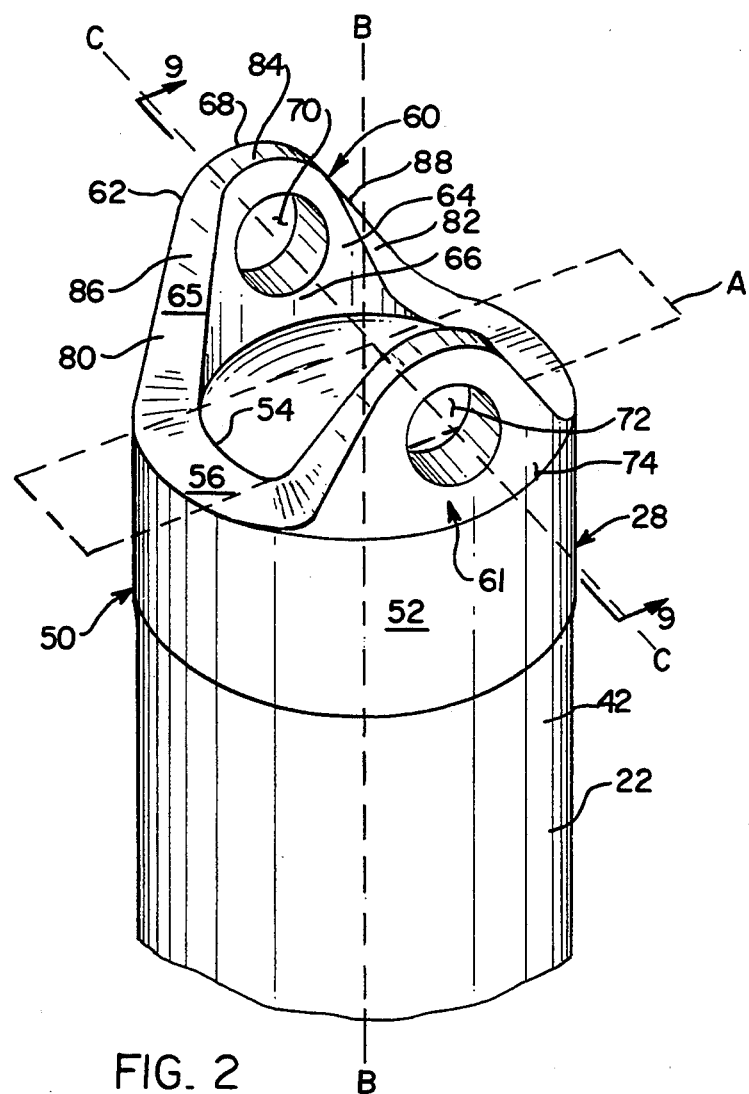
FIG. 2 is a perspective view of the universal joint yoke of the invention attached to a drive shaft.

FIG. 2 shows universal joint yoke 28 attached to second shaft 22 in a perspective view. As will be explained hereinafter, the universal joint yoke 28 is preferably vacuum die casted as a unitary article. The universal joint yoke 28 consists of a generally cylindrical tubular body 50 having an outer surface 52 and an inner surface 54. The outer surface 52 and inner surface 54 are connected by a connecting surface 56 disposed therebetween. The tubular body connecting surface 56 lies in a plane "A" which is oriented generally perpendicularly to the central axis "B" of the tubular body 50.

A pair of ears 60 and 61 project generally axially from the tubular body connecting surface 56. Both ears are similar in structure, so only ear 60 will be described. Ear 60 also has an outer surface 62, an inner surface 64 and a connecting surface 65 disposed between the outer surface 62 and inner surface 64. The outer surface 62 and inner surface 64 of the ear 60 are both arcuate and generally radially inwardly concave.

Ear 60 has a base 66 disposed adjacent the tubular body 50 and a distal end 68 disposed opposite of the tubular body 50. Ear 60 also defines a generally circular hole 70 which is adapted to receive the universal joint bearing. It can be seen that ear 61, which is diametrically opposed to ear 60, also defines a hole 72, and that the holes are substantially aligned along a common axis "C". This can also be seen in FIG. 3.

Figure 3:
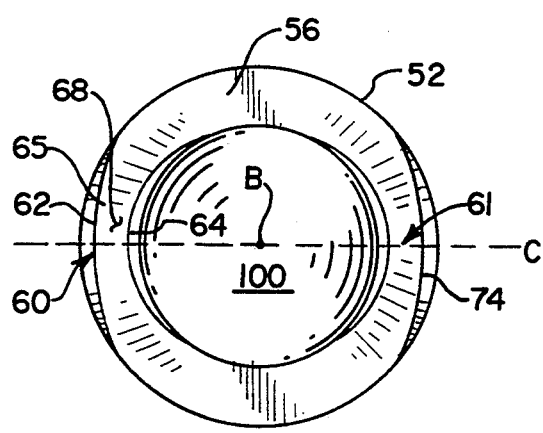
FIG. 3 is a top plan view of the yoke of FIG. 1.
Figure 4:
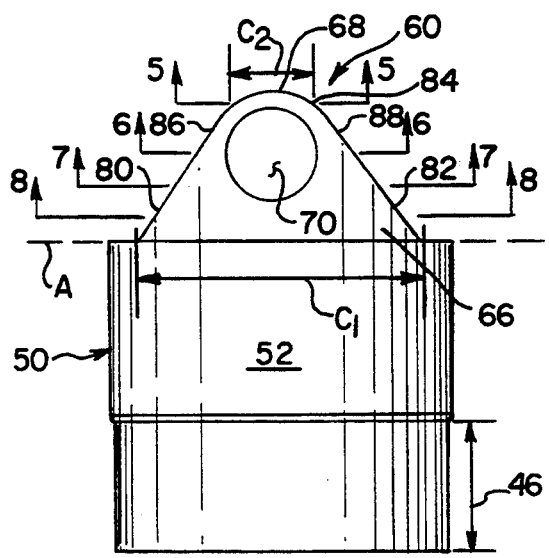
FIG. 4 is a side elevational view of the yoke showing one of the ears.

Referring to FIGS. 2 and 3, it can also be seen that the outer surface 52 of the tubular body is generally aligned with the outer surface 62 of ear 60 and the outer surface 74 of ear 61. This will also eliminate a step or discontinuity in the respective outer surfaces of the ears 60 and 61 and the tubular body 52 at the junction thereof. This will reduce stress concentrations and thus enhance durability.

Referring to FIG. 4 and FIGS. 5-8, the configuration of the ears will be discussed. As explained above, ear 60 has a base 66 disposed adjacent to the tubular body 50 and a distal end 68 disposed opposite or away from the tubular body 50. The circumferential extent $C_1$ of the base 66 is greater than the circumferential extent $C_2$ of the distal end 68 with ear 60 tapering from base 66 to the distal end 68. This configuration facilitates the shaping of the ear 60 as will be explained hereinafter.

FIGS. 5-8 illustrate the configuration of the ear connecting surface 65. The ear connecting surface 65 has a pair of lower portions 80 and 82 adjacent the base 66, an upper portion 84 adjacent the distal end 68 and a pair of transition portions 86 and 88 connecting the lower portions 80 and 82 to the upper portion 84. These portions can also be seen in FIG. 2.

Figure 5:
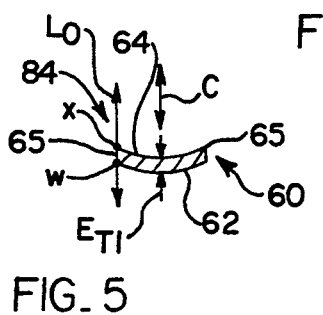
FIG. 5 is a sectional view taken through line 5—5 of FIG. 4.

FIG. 5 shows a cross-sectional view near the upper portion 84. As can be seen, the upper portion is oriented such that a generally straight line $L_0$ drawn between (i) point "W" on the junction of the outer surface 62 of the ear 60 and the upper portion 84 of the ear connecting surface 65 and (ii) a point "X" on the junction of the inner surface 64 of the ear 60 and the upper portion 84 of the ear connecting surface 65 is generally parallel to the common axis "C" between the holes 70 and 72 of ears 60 and 61. This configuration will provide maximum strength to the portion of the ears 60 and 61 containing the holes 70 and 72 against "tear out" forces from the bearings, such as bearing 32.

Figure 6:
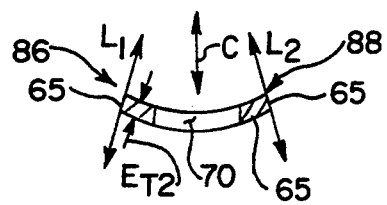
FIG. 6 is a sectional view taken through line 6—6 of FIG. 4.
Figure 7:
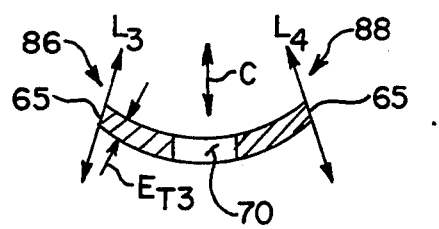
FIG. 7 is a sectional view taken through line 7—7 of FIG. 4.

FIG. 6 shows a cross-sectional view of the upper part of the transition portions 86 and 88. As can be seen, the transition portions are not generally parallel to the common axis "C" Lines $L_1$ and $L_2$ (formed by similar points as was the line consisting of points "W" and "X" in FIG. 5) are rotated inwardly from line $L_0$ in FIG. 5. In FIG. 7, the lower part of the transition portions 86 and 88 are rotated even further inwardly from lines $L_1$ and $L_2$, as can be seen from lines $L_3$ and $L_4$.

Figure 8:
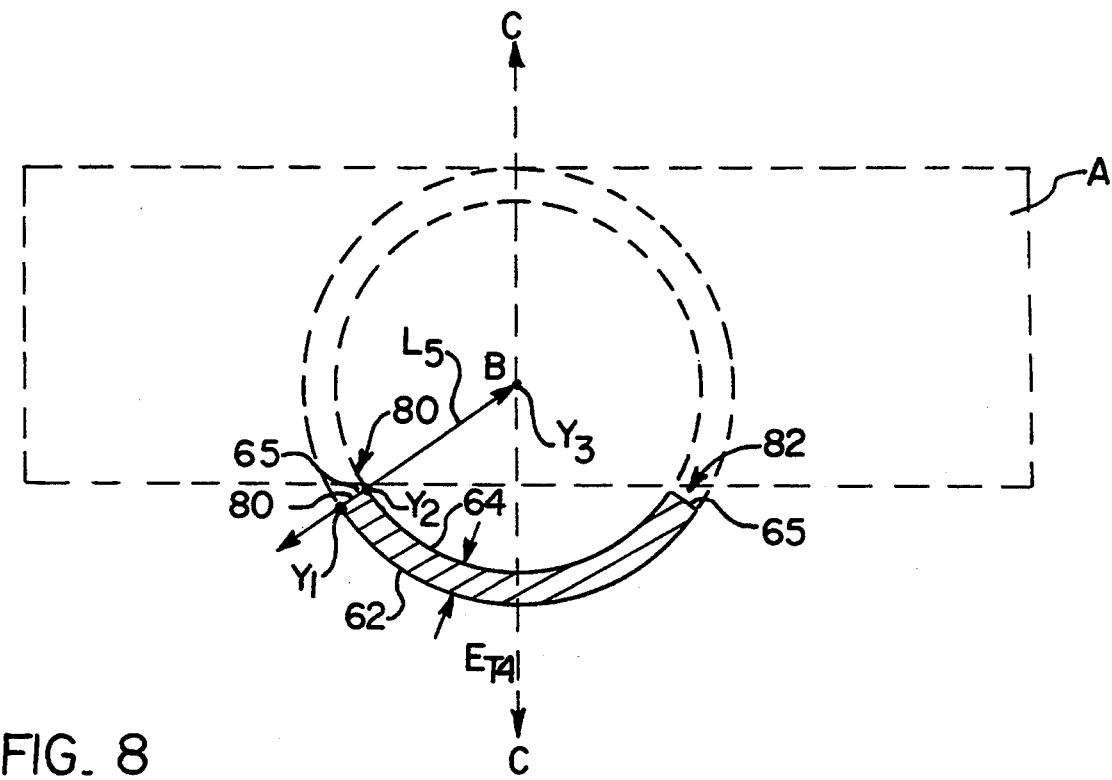
FIG. 8 is a sectional view taken through line 8—8 of FIG. 4.

FIG. 8 shows a cross-sectional view of the lower portions 80 and 82 of the ear connecting surface. Lower portion 80, for example, is oriented such that a generally straight line $L_5$ drawn in the tubular body connecting surface plane "A" (see also FIGS. 2 and 4) goes through (i) a point $Y_1$ at the junction of the outer surface 62 of the ear 60 and the lower portion 80 of ear connecting surface 65; (ii) a point $Y_2$ at the junction of the inner surface 64 and the lower portion 80 of ear connecting surface 65; and (iii) a point Y₃ on the axis "B" of the tubular body 50, which is shown in phantom in FIG. 8.

The radial disposition of the ear connecting surface 65 will smoothly flow the stresses resulting from the torque being transmitted to the yoke body without concentrating these stresses at the junction of the ears 60 and 61 with the tubular body 52. The radial disposition of the ear connecting surface 65 is gradually rotated to become parallel to the common axis "C" at the distal end 84 of the ear 60. This ear connecting surface configuration will notably reduce stress concentrations at the junction of the ear 60 with the tubular body but also provide maximum strength to handle the "tear out" forces at the distal end 84 of the ear 60.

Referring again to FIGS. 5–8, it can also be seen that the radial thickness of the ears increases from distal end 68 to base 66. The radial thickness of ear 60 at the upper portion 84 of ear connecting surface 65 as shown in FIG. 5 is represented as $ET_1$. The radial thickness at the upper section of transition portions 86 and 88 is $ET_2$ and at the lower section of transition portions 86 and 88 is $ET_3$. Finally, the radial thickness of ear 60 at the lower portions 80 and 82 is $ET_4$. As can be seen, the thickness of the ears tapers from $ET_4$ at the base 66 to $ET_1$ at the distal end 68 with the radial thickness $ET_4$ being greater than the radial thickness $ET_1$. This configuration puts more material at the junction of the ears 60 and 61 and the tubular body 50 so as to provide a larger torsional load resistance for a given amount of material.

Figure 9:
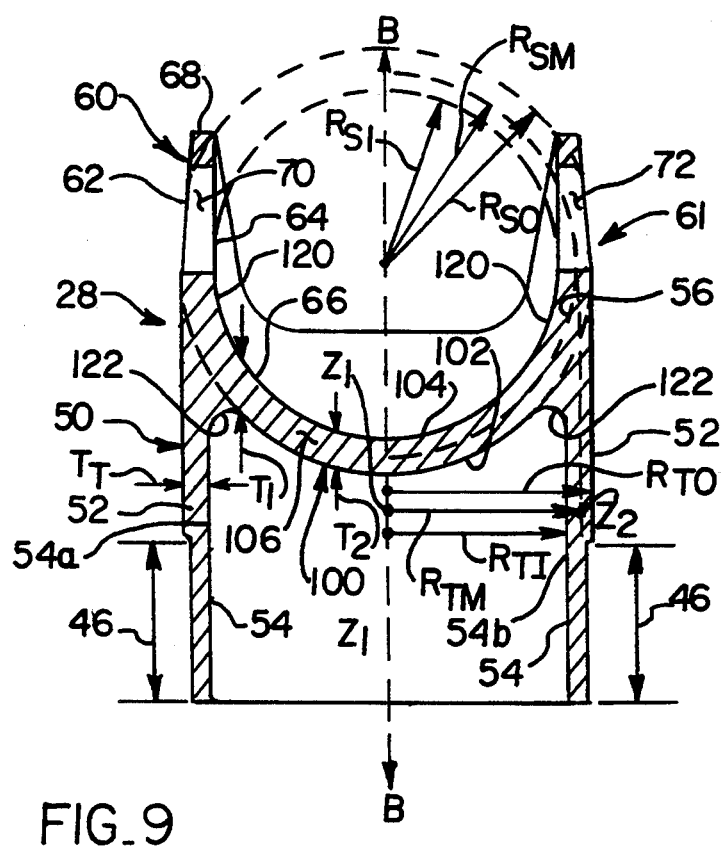
FIG. 9 is a sectional view taken through line 9—9 of FIG. 2.

FIG. 9 is a cross-sectional view of the universal joint yoke 28 which shows the generally concave upwardly (with reference to the orientation of the universal joint yoke shown in FIGS. 2 and 9) endcap 100 of the invention. In this view, the endcap 100 connects inner surfaces 54a and 54b of the tubular body inner surface 54 (see also FIG. 3). As is known, the endcap 100 provides a barrier for resisting dirt and particulates from entering into the hollow drive shaft. The endcap 100 also resists water from entering the hollow drive shaft. This resists subsequent freezing of the water in the drive shaft which in turn prevents metal fatigue of the drive shaft due to the formation of ice therein. Finally, the endcap 100 stiffens the universal joint yoke 28.

Referring particularly now to FIG. 9, the endcap 100 has an inner surface 102, an outer surface 104 and a connecting surface 106 therebetween. The endcap 100 has a thickness $T_1$ near the junction of the endcap 100 with the tubular body 50 and a thickness $T_2$ in the region near the axis "B" of the tubular body 50. The thickness $T_1$ is greater than the thickness $T_2$ because the forces of the junction of the endcap 100 and the tubular body 50 are greater than the forces near the axis "B". The average thickness of the endcap 100 is generally equal to the thickness of the tube $T_T$. The junction 120 of the endcap 100 outer surface 104 with the ears 60 and 61 inner surface 64 is blended so as to reduce stress concentrations thereon. In addition, the junction 122 of the endcap 100 inner surface 102 with the tubular body 50 inner surface 54 is also blended so as to reduce stress concentrations thereon.

The endcap 100 as can be seen in FIG. 9 is generally upwardly concave. The endcap 100 is preferably formed as the frustum of a hollow sphere (shown in phantom in FIG. 9), the sphere having an outer radius $R_{SO}$, an inner radius $R_{SI}$ and a radius measured to the midpoint between the outer and inner surface, $R_{SM}$. As can also be seen in FIG. 9, the tubular body 50 has an outer radius $R_{TO}$, an inner radius $R_{TI}$ and a radius measured from a point $(Z_1)$ on axis "B" to the midpoint $(Z_2)$ between the outer and inner surface $R_{TM}$. In accordance with the invention, the radius $R_{SM}$ is generally equal to the radius $R_{TM}$. In this way, the junction between endcap 100 and the tubular body 52 is smooth, without the need for a step or discontinuity. This will resist stress concentrations and permit smoother flow of forces which in turn improves the durability of the universal joint yoke 28.

A universal joint yoke in accordance with the invention is made preferably of heat treatable aluminum/magnesium/silicone alloy having $T_6$ temper by a vacuum die casting process. Such a process and machines therefore are disclosed in commonly owned U.S. Pat. No. 5,076,344, the disclosure of which is expressly incorporated herein. The vacuum die casting method allows the yoke to be formed in accordance with the invention.

The vacuum die casting makes possible the forming of a unitary universal joint yoke having numerous features and configurations including, but not limited to the following: (i) the curved ears 60 and 61; (ii) the tapering of the thickness of the ears from the base 66 to the distal end 68; (iii) the orientation of the ear connecting surface 65; (iv) the blending of the base 66 to the tubular body 52; and (v) the blending of the junction of the endcap 100 to the tubular body 52.

After vacuum die casting a universal joint yoke blank, there may be several post casting machining tasks to be performed on the blank. These tasks include machining the holes 70 and 72 into the ears 60 and 61 of the blank to make the universal joint yoke. Other tasks may include trimming burrs or other types of finish machining.

The vacuum die casted yoke also facilitates welding of the drive shaft to the vacuum casted yoke. This is because of the low porosity of the vacuum die casted yoke. Prior art casted yokes had higher porosities, thus welding of the yokes to the drive shaft was not possible. Another method of the invention, therefore, is a method of producing a drive assembly comprising providing a vacuum die casted universal joint yoke, providing a drive shaft and welding the drive shaft to the universal joint yoke to create the drive assembly.

It will be appreciated that a universal joint yoke has been disclosed which provides more uniform stress concentrations, more stiffness and thus a higher performance part made of more lightweight materials.

Whereas a particular embodiment of the invention has been described above, for purposes of illustration, it will be evident to those skilled in the art that numerous variations of the details may be made without departing from the invention as defined in the appended claims.

What is claimed is:

1. A universal joint yoke comprising:
    a generally cylindrical tubular body having an outer surface, an inner surface and a connecting surface disposed between said outer surface and said inner surface;
    said tubular body connecting surface being generally oriented in a plane which is generally perpendicular to the axis of said tubular body;
    a pair of ears projecting generally axially from one end of said tubular body;
    said ears having an outer surface, an inner surface and a connecting surface disposed between said outer surface and said inner surface;

said ears having a base disposed adjacent said tubular body and a distal end disposed opposite said base;

each of said ears defining a hole, said holes being substantially aligned along a common axis;

each of said ear connecting surfaces having a pair of lower portions adjacent said base, an upper portion adjacent said distal end and a pair of transition portions connecting said lower portions to said upper portion;

said lower portions are oriented such that a generally straight line drawn in said tubular body connecting surface plane goes through (i) a point at the junction of said ear outer surface and said ear connecting surface; (ii) a point at the junction of said ear inner surface and said ear connecting surface; and (iii) a point on said axis of said tubular body;

said upper portion is oriented such that a generally straight line drawn between (i) a point on the junction of said ear outer surface and said ear connecting surface and (ii) a point at the junction of said ear inner surface and said ear connecting surface is generally parallel to said common axis; and said ear connecting surface at said base has a greater radial thickness than the radial thickness of said ear connecting surface at said ear distal end.

2. The yoke of claim 1, wherein
said tubular body outer surface is generally aligned with said ear outer surfaces.

3. The yoke of claim 1, wherein
said ears are generally diametrically opposed to each other.

4. The yoke of claim 1, wherein
the circumferential extent of said distal end is less than the circumferential extent of said base portion.

5. The yoke of claim 4, wherein
said ears taper from said base to said distal end.

6. The yoke of claim 4, wherein
said ear inner surfaces are arcuate and generally radially inwardly concave.

7. The yoke of claim 6, wherein
said ear outer surfaces are arcuate and generally radially inwardly concave.

8. The yoke of claim 1, wherein
said tubular body has an endcap.

9. The yoke of claim 8, wherein
said endcap is generally upwardly concave facing towards said ears.

10. The yoke of claim 1, wherein
said universal joint yoke is make of an aluminum/magnesium/silicone alloy.

11. The yoke of claim 10, wherein
said universal joint yoke is produced by a vacuum die casting process.

12. A universal joint yoke comprising:
a generally cylindrical tubular body having an outer surface, an inner surface and a connecting surface disposed between said outer surface and said inner surface;

said tubular body connecting surface being generally oriented in a plane which is generally perpendicular to the axis of said tubular body;

a pair of ears projecting generally axially from one end of said tubular body;

said ears having an outer surface, an inner surface and a connecting surface disposed between said outer surface and said inner surface;

said ears having a base disposed adjacent said tubular body and a distal end disposed opposite said base;

each of said ears defining a hole, said holes being substantially aligned along a common axis;

each of said ear connecting surfaces having a pair of lower portions adjacent said base, an upper portion adjacent said distal end and a pair of transition portions connecting said lower portions to said upper portion;

said lower portions are oriented such that a generally straight line drawn in said tubular body connecting surface plane goes through (i) a point at the junction of said ear outer surface and said ear connecting surface; (ii) a point at the junction of said ear inner surface and said ear connecting surface; and (iii) a point on said axis of said tubular body;

said upper portion is oriented such that a generally straight line drawn between (i) a point on the junction of said ear outer surface and said ear connecting surface and (ii) a point at the junction of said ear inner surface and said ear connecting surface is generally parallel to said common axis;

said tubular body has an endcap;

said endcap is generally upwardly concave facing towards said ears; and said endcap is formed as the frustum of a hollow sphere, said frustum of said hollow sphere having an inner surface, an outer surface and a connecting surface between said endcap outer surface and said endcap inner surface; and the radius of said sphere as measured from the midpoint of said connecting surface is generally equal to the radius of said tubular body as measured from the midpoint of said tubular body connecting surface.

13. The yoke of claim 12, wherein
said endcap thickness is greater at the junction of said endcap with said tubular body inner surface than at a region near said axis of said tubular body.

14. The yoke of claim 13, wherein
said endcap includes blended portions at (i) the junction of said endcap inner surface and said tubular body inner surface and (ii) the junction of said endcap outer surface and said tubular body inner surface.

15. A universal joint yoke comprising:
a generally cylindrical tubular body having an outer surface, an inner surface, and a connecting surface between said inner surface and said outer surface; and a pair of ears projecting generally axially from one end of said tubular body, each of said ears defining a hole;

said tubular body having an endcap formed as the frustum of a hollow sphere, said frustum of said hollow sphere having an inner surface, an outer surface and a connecting surface between said inner endcap surface and said outer endcap surface, the radius of said sphere as measured from the midpoint of said connecting surface being generally equal to the radius measured from the midpoints of said tubular body connecting surface.

16. The yoke of claim 15, wherein
said endcap thickness is greater at the junction of said endcap with said tubular body inner surface than at other portions of said endcap.

17. The yoke of claim 16, wherein
said endcap includes blended portions at (i) the junction of said endcap inner surface and tubular body inner surface and (ii) the junction of said endcap outer surface and said tubular body inner surface.

* * * * *

UNITED STATES PATENT AND TRADEMARK OFFICE
CERTIFICATE OF CORRECTION

PATENT NO. : 5,342,243
DATED : August 30, 1994
INVENTOR(S) : Dinesh C. Seksaria et al It is certified that error appears in the above-indentified patent and that said Letters Patent is hereby corrected as shown below:

Col. 7, line 37　　　　　　　Change "4" to --1--.
Claim 4

Col. 7, line 49　　　　　　　Change "make" to --made--.
Claim 14

Signed and Sealed this

Thirtieth Day of January, 1996

Attest:

BRUCE LEHMAN

Attesting Officer　　　　Commissioner of Patents and Trademarks